F. F. WUNDER.
CLUTCH HOLDER.
APPLICATION FILED JAN. 30, 1922.
1,434,760.
Patented Nov. 7, 1922.
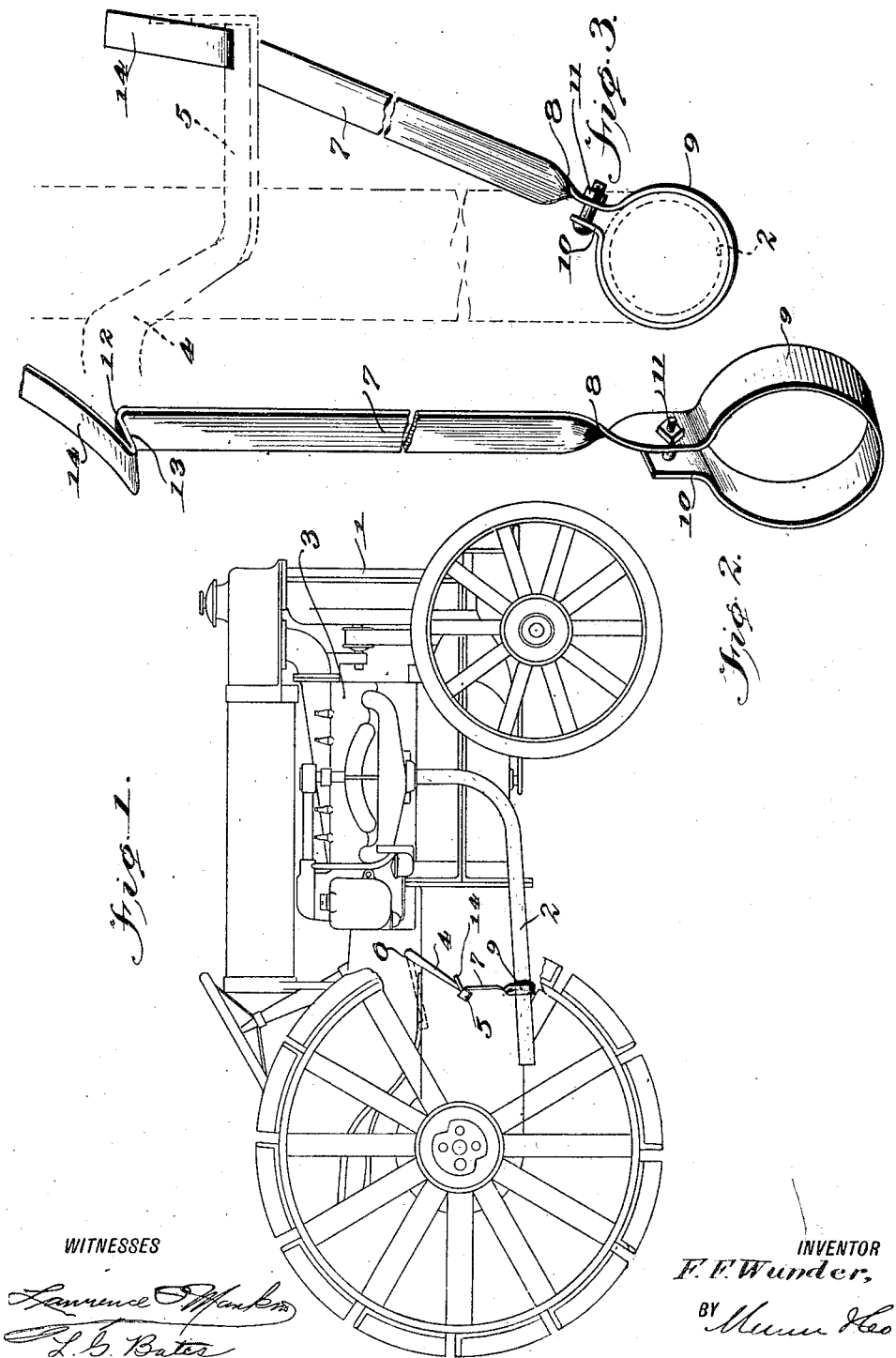
WITNESSES
INVENTOR
F. F. Wunder,
BY
ATTORNEYS Patented Nov. 7, 1922.

1,434,760

UNITED STATES PATENT OFFICE.

FRANK FREDERICK WUNDER, OF VALLEY FALLS, KANSAS.

CLUTCH HOLDER.

Application filed January 30, 1922. Serial No. 532,574.

*To all whom it may concern:*

Be it known that I, FRANK F. WUNDER, a citizen of the United States, and a resident of Valley Falls, in the county of Jefferson and State of Kansas, have invented certain new and useful Improvements in Clutch Holders, of which the following is a specification.

My invention relates to improvements in devices which are adapted for attachment to a tractor to engage a clutch control lever of the tractor to releasably hold the latter in position to occasion the releasing of the driving connection between the engine of the tractor and the transmission thereof, without disengaging the gears of the transmission.

An object of my invention is to provide an improvement over the clutch holder disclosed in my prior application for Letters Patent of the United States, Serial No. 512,236, filed November 2, 1921, in which a clutch holder of the character described is disclosed, said improvement consisting in the provision of a clutch holder which is equally effective for the purpose intended and in which the construction is simplified.

A further object of my invention is to provide a clutch holder which comprises but a single piece of a material having sufficient inherent resiliency to render it suitable for the purpose intended and an element for fastening the clutch holder to a tractor.

Other objects and advantages will be apparent from the following description, and the novel features of the invention will be particularly outlined in the appended claims.

My invention is illustrated in the accompanying drawings, forming a part of this application, in which:—

Fig. 1 is a side elevation of a tractor equipped with my invention,

Fig. 2 is an enlarged perspective view of the holder detached from the tractor, and Fig. 3 is a view, partly diagrammatical, showing the clutch holder in active or engaged position.

Referring now to the drawings, a tractor of a well known type of construction is designated generally at 1. The tractor embodies an exhaust pipe 2 extending rearwardly of an engine 3. A clutch control lever 4 having a horizontally disposed foot-engaging portion 5 is pivotally supported at 6 in position to be conveniently operated by the foot of an operator of the tractor and moved against the action of a spring (not shown) from the dotted line position in Fig. 1 to the full line position in the same figure. The clutch control lever is supported in a plane above that of the exhaust pipe 2.

The parts described so far are ordinary in construction and form no part of my invention except in so far as they cooperate with the parts which will now be described.

In carrying out my invention, I make use of a single piece of metal 7 of bar formation which is by preference flat and which may be made of any material having inherent spring qualities and being sufficiently strong for the purpose intended, as will be understood from the following. The bar 7 is twisted at 8 at a predetermined distance from the lower end thereof and the portion of the bar below the twisted portion is bent to provide a clamping ring 9 having its axis extending substantially at right angles to the axis of the body of the bar. The clamping ring portion 9 is of course of the split ring type and the lower extremity of the bar is bent at 10 to extend in parallelism with the lower part of the twisted portion 8 and being adjacent thereto.

The clamping ring 9 is adapted to embrace the exhaust pipe 2 and is secured thereon through the agency of a bolt 11 projected through alined openings formed through the bent portion 10 and the lower part of the twisted portion 8.

The bar 7 is bent laterally adjacent to its upper end to provide a hook portion 12 having an upper side 13 joined to the body of the bar at an angle less than 90°. The upper end portion 14 of the bar is then bent rearwardly and upwardly of its line of juncture with the upper side portion of the hook and extends at an acute angle to the latter.

From the foregoing description of the various parts of the device, the operation thereof may be readily understood. When the device is intended for application to the tractor illustrated, the line of juncture of the upper side 13 of the hook 12 with the body of the bar is inclined from the horizontal when the body of the bar is in perpendicular position, so that the upper side 13 of the hook will be horizontally disposed when the body of the holder is inclined or tilted laterally of the tractor, as best seen in Fig. 3. The clutch holder is positioned upon the exhaust pipe 2 so that the foot-engaging portion 5 of the clutch control lever 4 in passing from the dotted line position illustrated in Fig. 1 to the full line position of the same figure, will contact adjacent to its outer end with the inclined upper end portion 14 of the clutch holder. The swinging portion 5 of the clutch control lever will push the upper end of the body 7 before it until the portion 5 has passed below the plane of the juncture of the end portion 14 with the upper side of the hook portion 12. The inherent resiliency of the body of the clutch holder will then cause the upper end portion thereof to spring back to the position from which moved by the portion 5 of the clutch control lever and the latter will be engaged adjacent to its outer end by the hook portion 12, whereby the clutch control lever will be held against return to the dotted line position of Fig. 1. It will be understood of course that when the clutch control lever is in the full line position of Fig. 1, the driving connection between the engine of the tractor and the transmission will be disengaged with the necessity for disengaging the gears of the transmission obviated.

When it is desired to disengage the clutch control lever 4 from the hook 12 to permit of the return thereof to the dotted line position shown in Fig. 1, the foot of the operator is pressed or sharply struck against the upper part of the end portion 14, thereby bringing the upper side 13 of the hook 12 upwardly and forwardly to a sufficient extent to release the foot-engaging portion 5 which will swing upwardly against the foot of the operator and may be permitted to return to initial or dotted line position by relaxing the pressure of the foot thereagainst. When the clutch control lever 4 is in the dotted line position of Fig. 1, the driving connection between the engine of the tractor and the transmission will be again established.

It will thus be apparent that I provide a clutch holder of a very simple construction which can be manufactured cheaply and readily applied to a tractor for use in performing the functions described. Obviously, my invention is susceptible of embodiment in forms varying in detail from that illustrated in the accompanying drawings and I therefore consider as my own, all such modifications and adaptations of the form of the device illustrated and described herein as fairly fall within the scope of the appended claims.

I claim:—

1. As an article of manufacture, a clutch holder comprising an elongated body having an integral hook portion at one end thereof and a clamping ring portion at the other end thereof.

2. As an article of manufacture, a clutch holder comprising a straight elongated body having a hook portion at one end thereof, a clamping ring portion at the other end thereof, and a twisted portion merging the clamping ring portion and the body one into the other.

3. As an article of manufacture, a clutch holder formed of a single bar made of a material having spring qualities and being fashioned to provide a straight body portion, a hook portion at one end of the body, a clamping ring portion at the other end of the body, and a twisted portion merging the clamping ring portion and the body one into the other, whereby the axis of the clamping ring portion extends substantially at right angles to the axis of the body.

4. As an article of manufacture, a clutch holder comprising a single bar of a material having spring qualities, said bar being fashioned to provide a straight body and being bent at one end of the body laterally and downwardly to provide the upper side of a hook portion and then backwardly and upwardly to provide an inclined extension to the upper side of the hook portion, said bar being bent to provide a twisted portion at the opposite end of the body and a clamping ring portion at the end of the twisted portion, said clamping ring portion having an end bent radially to extend in parallelism with the lower part of the twisted portion and being adjacent thereto, and the axis of said clamping ring portion extending substantially at right angles to the axis of the body.

5. As an article of manufacture, a clutch holder comprising an elongated body made of a material having inherent resilient spring qualities and being adapted at its one end for attachment to a fixed support, and an integral hook portion at the other end of the body, said hook portion having a bar-like extension merged into the bill of the hook at its extremity and extending rearwardly and upwardly to lie in angular relation to the bill of the hook, as and for the purpose set forth.

FRANK FREDERICK WUNDER.